United States Patent [19]

Bernstein et al.

[11] Patent Number: 5,155,594
[45] Date of Patent: Oct. 13, 1992

[54] HIERARCHICAL ENCODING METHOD AND APPARATUS EMPLOYING BACKGROUND REFERENCES FOR EFFICIENTLY COMMUNICATING IMAGE SEQUENCES

[75] Inventors: Jeffrey Bernstein, Marblehead; Bernd Girod, Boston; Xiancheng Yuan, Bedford, all of Mass.

[73] Assignee: PictureTel Corporation, Peabody, Mass.

[21] Appl. No.: 697,973

[22] Filed: May 10, 1991

Related U.S. Application Data

[63] Continuation of Ser. No. 521,976, May 11, 1990, abandoned.

[51] Int. Cl.⁵ .............................................. H09N 7/13
[52] U.S. Cl. ...................................... 358/136; 358/135
[58] Field of Search .......................... 358/133, 135, 136

[56] References Cited

U.S. PATENT DOCUMENTS

| | | | |
|---|---|---|---|
| 4,689,673 | 8/1987 | Ohki et al. | 358/136 X |
| 4,703,350 | 10/1987 | Hinman . | |
| 4,717,957 | 1/1988 | Santamaki et al. . | |
| 4,718,104 | 1/1988 | Anderson . | |
| 4,727,422 | 2/1988 | Hinman . | |
| 4,794,455 | 12/1988 | Ericsson | 358/136 X |
| 4,802,006 | 1/1989 | Iinuma et al. | 358/136 X |
| 4,816,914 | 3/1989 | Ericsson . | |
| 4,833,535 | 5/1989 | Ozeki et al. . | |
| 4,849,810 | 7/1989 | Ericsson . | |
| 4,864,396 | 9/1989 | Martens | 358/133 |

Primary Examiner—Victor R. Kostak
Attorney, Agent, or Firm—Hale and Dorr

[57] ABSTRACT

A method and apparatus for transmitting a sequence of image frames by encoding interframe error data features the steps of compiling a spatially decomposed image of a background of the sequence of image frames, spatially decomposing a warped image of a previous frame, and spatially decomposing a new input image. The spatially decomposed input image is compared with the spatially decomposed background image and with the spatially decomposed warped image. An error signal defining the spatially decomposed input image is generated based on these comparisons.

22 Claims, 8 Drawing Sheets

HIERARCHICAL ENCODING METHOD AND APPARATUS EMPLOYING BACKGROUND REFERENCES FOR EFFICIENTLY COMMUNICATING IMAGE SEQUENCES

This is a continuation of U.S. application Ser. No. 07/521,976 filed May 11, 1990 now abandoned.

BACKGROUND OF THE INVENTION

The invention relates generally to communicating sequences of image data over a narrow bandwidth communication channel such as, a telephone communications channel.

Image data, such as a video signal, consists of a sequence of images or frames. Since each frame contains a large amount of information, it is impossible to transmit the entire frame over a narrow bandwidth channel before the arrival of the next frame in the sequence. Accordingly, various techniques have been employed to compress the image data so as to reduce the number of bits of information to be transmitted. More specifically, these techniques take advantage of redundancies between successive frames, describing each frame in terms of changes from the previous frame.

In a typical video signal having moving objects, the principal change occurring between successive frames is the inhomogenous motion of objects within the field of view. Accordingly, the number of bits required to represent the sequence of frames can be reduced by describing each new frame in terms of the displacement of various components of the previous frame. This "motion compensation" technique requires substantially fewer bits to describe a sequence of images than other known data compression techniques. As a result, various motion compensating coding methods and apparatus have been developed employing this technique. These systems typically are either receiver-based motion compensation systems or transmitter-based motion compensation systems. In the receiver-based motion compensation system, the receiver makes a prediction as to the motion and compensates the previous frame for the expected motion. The transmitter, operating in the same manner, then sends only an error signal describing what must be done at the receiver in order to correct the receiver predicted frame. The error signal is typically coded to reduce its bandwidth.

For a transmitter-based motion compensation system, the motion estimation process occurs only at the transmitter. For example, the transmitter calculates displacement vectors representing the motion of various regions of the previous frame. This data is then transmitted to the receiver along with error information. The receiver first adjusts its image of the previous frame using the displacement vectors provided by the transmitter. The receiver then corrects the resultant image using the error information provided by the transmitter.

Typically, each displacement vector is associated with a specific region or block of the image. The blocks are typically non-overlapping and have, for example, a size of eight picture elements (pixels) by eight picture elements. Various methods have been employed for encoding the motion compensation data associated with each of the blocks. Ericsson, in his U.S. Pat. No. 4,849,810, the entire contents of which is incorporated herein by reference, describes a lossy coding method for encoding the motion-compensation displacement information.

The above described motion compensation systems work well in still and moving areas of a video frame. However, in typical video conferencing or video telephone sessions, a person is moving in front of a static background. The newly uncovered areas of the background cannot be predicted by displacement of the previous frame. The encoding of these unpredictable areas requires therefore a large number of bits.

Background prediction has been proposed as a solution to this problem. More specifically, the receiver maintains an image of the background of the field of view. When a person moves, thereby exposing a new portion of the background, the transmitter describes the exposed pattern with reference to the stored background image, thereby drastically reducing the number of bits required to encode the newly exposed areas.

Often, during heavy motion or scene changes, there exists substantial information to be transmitted, so that during a single frame time, insufficient bandwidth is available to transmit all of the information necessary to describe the frame. Accordingly, various methods have been implemented to encode and transmit the portion of the frame information which will minimize the image degradation. In his U.S. Pat. No. 4,849,810, Ericsson describes a hierarchical encoding method for efficiently communicating such image sequences so as to provide a more graceful degradation of the image during heavy motion or scene changes.

It is therefore an object of the present invention to transmit sequences of images over a narrow bandwidth communication channel using hierarchical encoding for efficiently communicating background prediction information. Another object of the invention is to reduce visible switching artifacts, which arise when switching between the background and motion compensated images, by independently selecting between the background and warped images at each resolution level of the hierarchically encoded images.

SUMMARY OF THE INVENTION

The invention relates to a method and apparatus for transmitting a sequence of image frames. The method features the steps of preparing a background pyramid data structure, having a plurality of decimation levels, which represents the background of the sequence of image frames. Similarly, a warped image pyramid data structure is prepared to represent a prediction of a current image frame based on a previous image frame. Current input image data, representing the current image frame, is decimated to generate a current image pyramid data structure. For each decimation level, each component of the current image pyramid data structure is compared with a corresponding component of the warped image pyramid data structure to form a first error signal. Each component of the current image pyramid data structure is also compared with a corresponding component of the background pyramid data structure to form a second error signal.

The first and second error signals are compared to determine whether the background pyramid data structure component more closely represents the current image data structure component than the warped image pyramid data structure component.

In other aspects of the invention, the method features comparing the current image data to previous image data representing a previous image frame. Based on the comparison, a motion signal is generated which represents the displacement of each of a plurality of blocks of the previous image. The motion signal is transmitted to the remote receiver to allow the receiver to prepare the warped image pyramid data structure.

In another aspect, the method features comparing each component of the current image pyramid data structure with a corresponding component of a default image pyramid data structure to form a third error signal. The third error signal is compared to the first error signal to determine which of the current image pyramid data structure component and the default image pyramid data structure component more closely represents the corresponding component of the current image data structure.

For each component, in the current image pyramid data structures, a code is transmitted to the remote receiver indicating which of the three data structures more closely represents the component of the current image pyramid data structure. The error signal corresponding to the data structure whose component more closely represents the component of the current image pyramid data structure is also transmitted to the remote receiver.

In one embodiment, the number of bits required to encode each error signal is estimated for use in selecting which data structure more closely represents the current image pyramid data structure. The data structure whose error signal requires the smallest estimated number of bits is selected for transmission.

Other objects, features, and advantages of the invention are apparent from the following description of particular preferred embodiments taken together with the drawings.

DESCRIPTION OF PARTICULAR PREFERRED EMBODIMENTS

Figure 1:
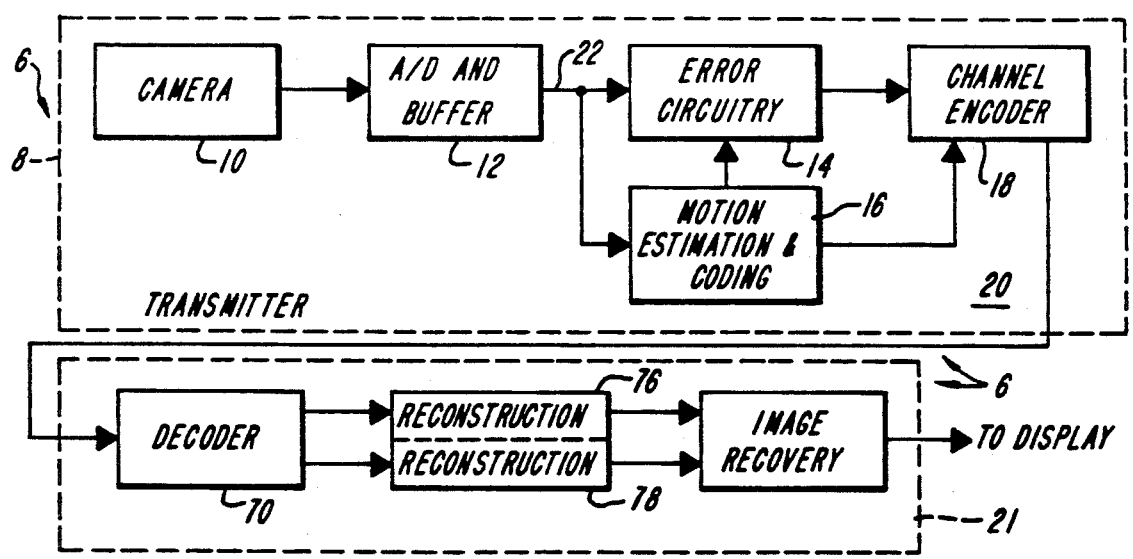
FIG. 1 is an electrical block diagram of a typical image communications system in accordance with the claimed invention.

Referring to FIG. 1, a communications system 6 has a transmitter 8 which, in accordance with a preferred embodiment of the invention, has a camera 10 for providing a video signal to an analog-to-digital converter and frame buffer 12. The frame buffer portion of the analog-to-digital converter and frame buffer 12 is capable of storing a full frame of the video signal, sampled to, for example, eight bits across a 256×240 pixel raster. Each pixel includes three color components (i.e., a luminance component L, and two chrominance components I and Q).

The entire coding and motion compensation process takes place in the digital domain. The transmitter has a motion estimation and coding circuitry 16 for generating a signal which describes the new frame in terms of the motion of various components of the previous frame. Since the motion estimation and coding circuitry 16 does not perfectly describe the new frame in terms of such displacements, the transmitter includes an error circuitry 14 for providing an error signal describing corrections to each color component of the image formed from the displacements. As will be explained in more detail below, if the new frame also contains recently exposed portions of the background, error circuitry 14 will include in the error signal, instructions for deriving those exposed portions from a stored image of the background. A channel encoder 18 encodes the outputs of error circuitry 14 and motion estimation and coding circuitry 16 and transmits the thus encoded data over channel 20 to a receiver 21.

During heavy motion or scene changes, the narrow bandwidth channel 20 cannot accommodate all the error information necessary to describe the new input frame. Accordingly, for purposes of calculating the error signal, the transmitter considers each frame image as a hierarchy of images, each hierarchical image having a slightly greater resolution than the hierarchical image of the immediately higher level. As explained more fully below, the transmitter calculates an error signal for each level of the hierarchy and transmits the high level error signals first, and as much of the lower level signals as time permits.

In the preferred embodiment, five levels of hierarchical images are used to fully define each color component (e.g., luminance) of an image to be transmitted. The highest level image includes only 16×15 picture elements. Each level of the hierarchy adds additional resolution to the image by a factor of two both horizontally and vertically. Thus, five levels of images for the luminance image are available at resolutions of, in the illustrated embodiment, 256×240, 128×120, 64×60, 32×30, and 16×15 picture elements. The set of images, at the different image resolutions, is commonly referred to as a "resolution pyramid." The base of the pyramid is the full resolution image while the top of the pyramid is, in the illustrated embodiment, the 16×15 pixel image. Similar pyramids are formed for the "I" and "Q" chrominance components of the color image.

Motion Estimation

Figure 2:
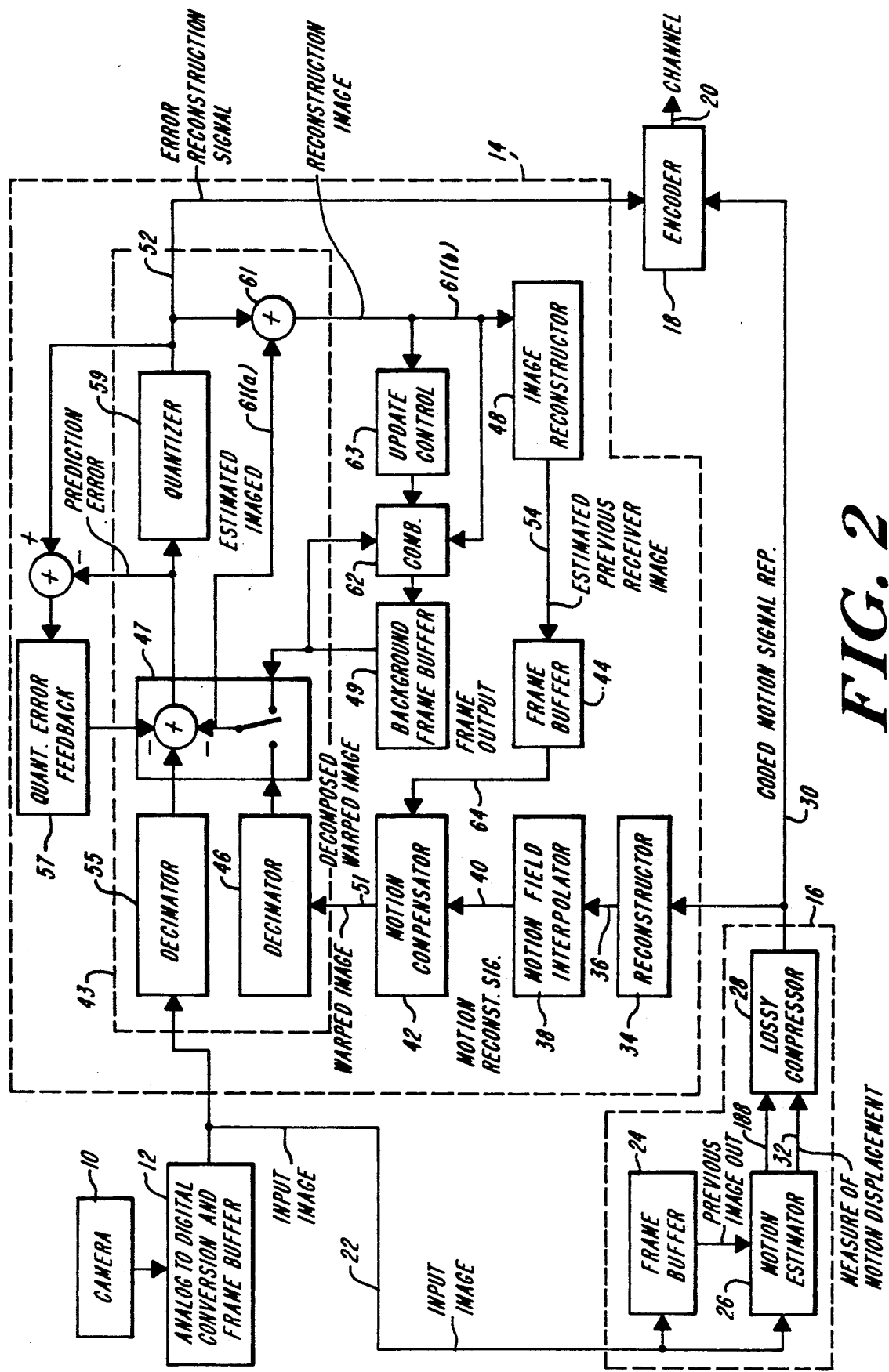
FIG. 2 is an electrical block diagram of the transmitter of a motion compensated image encoding apparatus employing the invention.

Referring to FIG. 2, the illustrated motion estimation and coding circuitry 16, in accordance with a preferred embodiment of the invention, compares the luminance component a new input frame image, available over lines 22, with the luminance of the previous input image, available in this illustrated embodiment from a frame buffer 24. Frame buffer 24 stores the image of the previous frame in a three level pyramid data structure. The highest level of the pyramid is a 32×30 pixel array derived from decimating (as described more fully below) the 256×240 pixel array provided by the luminance component of the new image which previously arrived over lines 22. The next level is a 64×60 pixel array derived in the same manner. Finally, the most detailed level is a 128×120 pixel array derived, not from the previously received image, but from the reconstruction of the previous frame as performed at the receiver. The technique used by the receiver for reconstructing frames is described below.

For purposes of comparing the new input image to the previous image stored in buffer 24, motion estimator 26 first decimates the input image data to produce a pyramid data structure having the same three levels of resolution (i.e., 128×120, 64×60 and 32×30). The motion estimator 26 generates for each level, a measure of the motion displacement between the new and previous frames. Any of a number of motion estimation devices as are well known in the art may be used to measure the displacement. In a preferred embodiment, the motion estimator implements an adaptive steepest descent error minimization method to generate the motion displacement measures as described in Hinman, U.S. Pat. No. 4,661,849, and Ericsson, U.S. Pat. No. 4,849,810, the contents of which are incorporated herein, in their entirety, by reference.

The output of the motion estimator 26 is a set of fields of motion vectors (one set for each level) which, as noted above, provide a measure of the displacement between successive input frames. This vector field provides a description of how to map the previous input frame from buffer 24 into the best approximation of the new input frame arrive over lines 22. By "best" is meant an error metric such as, for example, a mean-squared-error measure. Typically, and in the illustrated embodiment, the motion estimator uses a region matching technique between nonoverlapping blocks of the previous and new input images. Should motion occur for a region in the new image, the estimator will determine which block in the previous image is the best match for the block in the new image, and the value of the displacement is the difference between a new coordinate pair for the block in the new image and the original coordinate pair for the block in the previous image. That determination defines the motion vector to be associated with the block in the new image.

Since scenes are generally composed of several large objects moving uniformly over time, there is a high degree of correlation in the motion vector field. To avoid transmitting redundant information, and to reduce the data bit requirements, the preferred embodiment of the invention modifies the motion vector field, thereby losing some information, to facilitate the compression of the motion representing data. In the illustrated embodiment, this operation is represented by a "lossy compressor" 28 which reduces the amount of data, and hence the bandwidth, required to represent the motion vector field. Noting the similarity between motion vector field and natural images, predictive, transform, or interpolative coding of the two independent components of the vector field can be employed by the lossy compressor 28.

Entropy Encoding of the Motion Signal

Lossy compressor circuitry 28 is employed for coding the motion vector field available over lines 32, and provides, over lines 30, a coded motion signal representative of the motion vectors. This output of the lossy compressor, as noted above, will not, upon decoding, exactly reproduce the signals over lines 32 (which provide the measure of motion displacement) and, therefore, have some error signal associated with them. Nevertheless, the reduction in the data requirements of a lossy compressor, when compared to, for example, a PCM exact coding method, are so substantial, that the use of a lossy compressor, is a significant advance in the art. One preferred lossy compression circuitry employs adaptive predictive pulse coded modulation (ADPCM).

Figure 3:
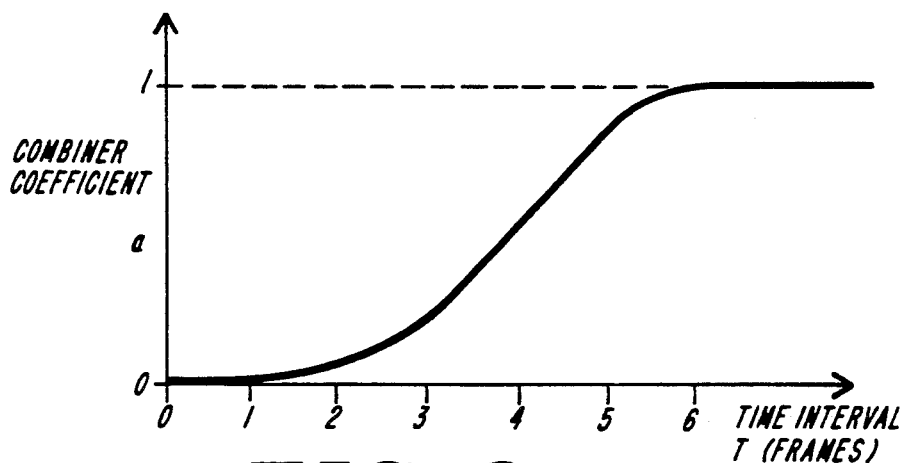
FIG. 3 is a diagram of the values of combining coefficient a(T).
Figures 3A, 8, 8A:
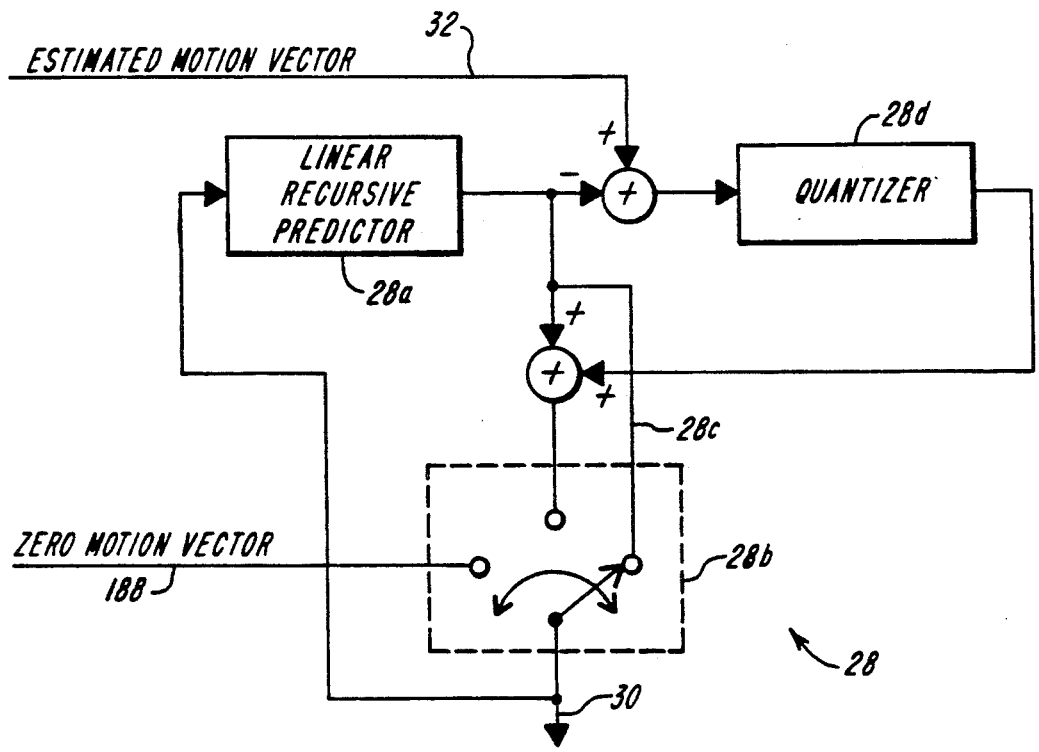
FIG. 3A is a diagram of a lossy compressor 28 according to the invention.
FIG. 8 is a diagrammatic presentation of the relative locations of adjacent blocks used in predicting an initial displacement motion vector value.
FIG. 8A is a diagram of the relative locations of adjacent motion vectors used in the linear predictor.

Referring to FIG. 3A, the lossy compressor circuitry 28, in the illustrated embodiment of the invention, includes a linear predictor 28a for providing a prediction of the motion vector field and includes additional circuitry for reducing the number of bits (the bandwidth) required to describe the prediction and prediction error of the motion vector field. Referring to the raster scanning pattern as shown in FIG. 8A, and to FIG. 3A, the linear predictor 28a (at each of the three resolution levels) predicts the current motion vector (marked X) using the four previously coded neighbors (marked 0) (previously available over lines 30). Then additional circuitry (embodied in switch circuitry 28b) makes a decision regarding three possible choices:

a) Reset the estimated motion vector to zero (the signals over line 188) and send it to the receiver;
b) Reset the estimated motion vector to the predicted value (over line 28c) and send it to the receiver; or
c) Quantize the prediction error (the difference between the original estimated motion vector and the predicted motion vector) in quantizer 28d and send the quantization index to the receiver.

Associated with each choice, there is an incurred cost (the bits N used to transmit that decision) and an error E (the mean squared error of the difference image block generated by using chosen motion vector). The additional circuitry 28b makes this decision using an entropy constrained error measure, that is, a weighted combination of the used bits and error (for example, a measure equal to (aN+bE) where "a" and "b" are constants experimentally determined for the apparatus). The result that produces the smallest entropy constrained error is chosen and transmitted. The encoding process starts by sending one bit of information about whether or not to reset the estimated motion vector to zero. If it is reset to zero, nothing more is sent for this motion vector. Otherwise, a second bit of information is sent to tell the receiver whether to use only the predicted motion vector or whether additional correctional information (the quantized error) will be sent. Finally, if correctional information is needed, the quantization index of the prediction error will be sent. In order to further reduce the number of bits for encoding, the lossy compressor employs arithmetic coding for the first two steps and Huffman coding for the last step.

The output of the lossy compressor circuitry over lines 30, as noted above, is passed to the encoder 18. In addition, those signals are employed by the error circuitry 14 for determining what the receiver would have seen, absent any errors in the channel, and thereby providing the mechanism for determining the prediction error signal, that is, the signal representing the difference between what the receiver would have predicted based upon the coded motion signal representation over lines 30, and the true image input.

The output of the lossy compressor over lines 30 is used by a reconstructor circuitry 34 for producing, at its output, a signal representative of the measure of motion displacement, the motion vectors, on lines 32. The difference between the signals over lines 36, the output of the reconstruction circuitry, and the signals over lines 32, represents the coding error introduced by the lossy compression apparatus 28. The output of the reconstruction apparatus 34, over lines 36, is directed to a motion field interpolation circuitry 38 which operates in the spatial domain to associate with each picture element a motion displacement vector. Thus, while the input signals over lines 36 represent motion displacements for groups or regions of elements, for example, the picture elements of a 4×4 block, the motion field interpolator, as described in more detail below, resolves that data so that there is associated with each picture element, a motion displacement vector. The resulting output of the motion field interpolator, over lines 40, is designated the motion reconstruction signal.

Calculation of the Error Signal

The motion reconstruction signal is applied to a motion compensator 42 which forms part of an error reconstruction loop. The error reconstruction loop simulates the same frame reconstruction process performed at the receiver. The most recently reconstructed frame (i.e., the previous receiver image) is stored in a frame buffer 44. The frame buffer 44 provides the previous receiver image to motion compensator 42 which estimates the new frame in accordance with the motion reconstruction signal 40 to form a warped image. The warped image is provided to an error calculation module 43 which compares the warped image to the current image. Module 43 includes a decimeter 46 for decimating the warped image into a warped image pyramid data structure.

The decimated warped image is then provided to predictor switch 47. Predictor switch 47 is also connected to a background frame buffer 49 and to decimeter 55. Decimeter 55 provides the predictor switch with a spatially decomposed version of the new input frame image. The predictor switch then calculates, for each level of the pyramid, a difference between a component of the warped image and the corresponding component of the input image to produce a warp error.

Similarly, the background frame buffer 49 provides the predictor switch with a background image pyramid data structure representative of the background of the field of view. The predictor switch then calculates, for each level of the pyramid, the difference between the same component of the decomposed input image and the corresponding component of the background image to produce a background error. Finally, the predictor switch calculates the difference between the same component of the input image and a default image whose color values are all zero, to calculate a zero prediction error. The predictor switch includes switch circuitry similar to circuitry 28b described above, for choosing which of the warped error, the background error and the zero prediction error, should be selected for transmission to the receiver. According to this technique, the error signal which produces the smallest entropy constrained error is chosen for transmission as the prediction error for that component.

The predictor switch further provides a reference point signal indicating whether the background frame, warped frame or default frame (herein reference frames) was selected as the reference point for the corresponding error component. The prediction errors and corresponding reference points are then quantized by quantizer 59 and merged into an error reconstruction signal 52. Quantizer 59 provides the error reconstruction signal 52 to encoder 18 which encodes and transmits the signal 52 to the receiver 21. (As will be explained in more detail with regard to FIG. 12, the difference between the input and output of quantizer 59 is computed and applied to quantization error feedback circuitry 57. Quantization error feedback circuitry 57 operates on the difference (i.e., quantization error) and applies the result to predictor switch 47. Accordingly, quantization errors introduced at one level of spatial decomposition can be accounted for in other levels of spatial decomposition.)

Image Reconstruction at the Receiver

The receiver decodes the error reconstruction signal 52 to determine the vector displacement, prediction error and reference point signals. From these signals, the receiver computes the new frame image. More specifically, the receiver first warps the previous receiver image in accordance with the vector displacement signal. It then compiles a prediction image using components of the background, warped and default frames selected in accordance with the reference point signal. At each level of the hierarchy, the prediction error components are then added to the prediction image. This image is then reconstructed to form a new video frame to be displayed.

Simulated Reconstruction at the Transmitter

While the receiver is reconstructing the new video frame, the transmitter's error circuitry 14 simulates the same reconstruction process to update the image stored in the previous frame buffer 44. Toward this end, the error reconstruction signal 52 is provided to an image compiler 61. The image compiler 61 combines the prediction image pyramid data structure provided over lines 61a (which can be either the background, warped images or default references in accordance with the decision of the predictor switch 47) with a reconstructed version of the quantized error reconstruction signal 52 to construct the same, image pyramid data structure constructed at the receiver.

The reconstructed receiver image on line 61(b) is sent to a reconstructor 48 which inverts to the decimation imposed by decimators 46, 55. There results, therefore, at the output of the reconstructor, the same estimated receiver image computed by receiver 21. The image in frame buffer 44 is then replaced with the new frame provided by reconstructor in preparation for the next frame.

Background Frame Buffer

The transmitter also maintains a background image pyramid data structure representative of the background of the field of view in the same manner as maintained by the receiver. The reconstructed video frame from image compiler 61 is adaptively combined with the current contents of the background frame buffer 49 as determined by an update controller 63. The update controller 63 segments the reconstructed image pyramid data structure into changed and unchanged regions. For each image component at each level of the background image pyramid data structures, the update controller monitors the time interval "T" that has elapsed since the component was last detected as changed and computes an update coefficient "a" as a function of T. Combiner 62 combines the current contents of the background frame buffer and the reconstructed frame according to the following equation:

new background value = (1−a(T)) *old background + a(T) *reconstructed frame where the value of "a" is a function of "T" as illustrated in FIG. 3. Thus, with the dependency a(T) as illustrated in FIG. 3, the background frame buffer component would not be altered if the component (in the reconstructed signal over line 61b) is the same for two consecutive frames. However, if the component is unchanged for several frame periods, the reconstructed signal is entered into the background frame buffer with full weight where a=1.

Error Calculation Module 43

As noted above, error calculation module 43 receives as inputs the original uncoded signal over line 22 and signals representing the estimated receiver image over lines 51. The module 43 uses those signals for encoding the difference between them, and outputs the encoded error reconstruction signal over lines 52. This signal corrects for most errors not properly compensated for by the motion compensation system.

Figure 10:
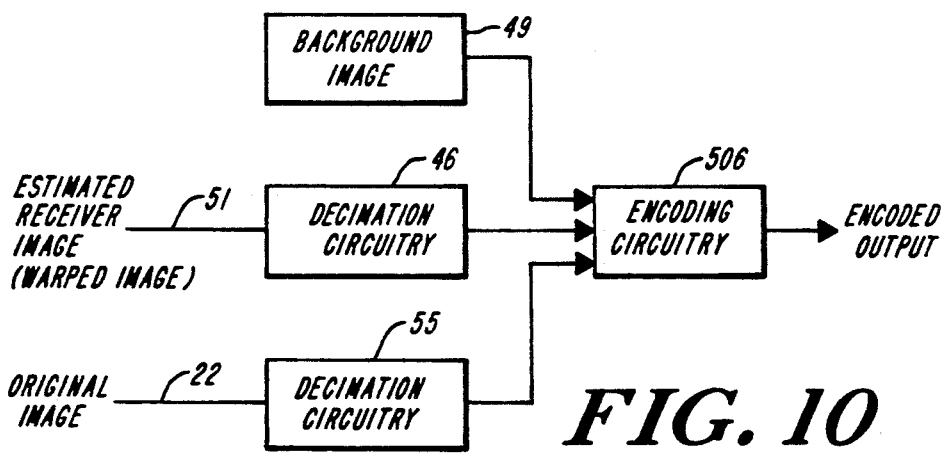
FIG. 10 is a block diagram of the error calculator 43 according to the invention.
Figure 11:
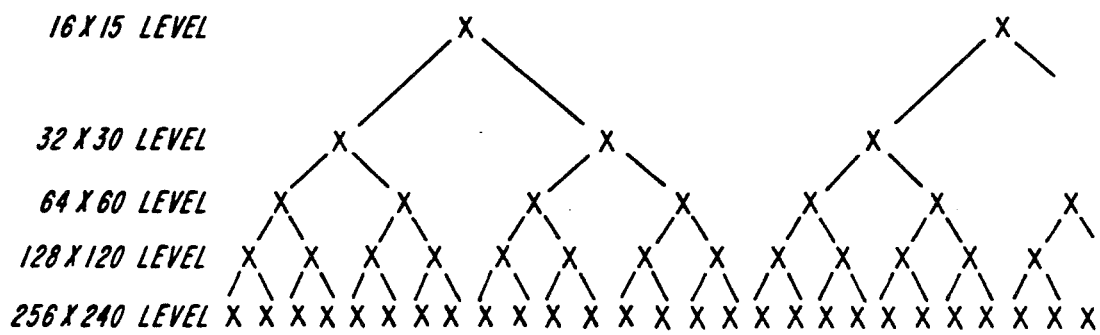
FIG. 11 is a diagrammatic representation of a one dimensional decimation process.

Referring now to FIGS. 10 and 11, the estimated receiver image over line 51 (often referred to as the "warped" image) and the original uncoded image over lines 22 are decimated (that is, filtered and subsampled as described below) by decimation circuitries 46, 55, respectively, four times. At each decimation stage, the image is subsampled by a factor of two both horizontally and vertically. Thus, five levels of images for the luminance image are available at resolutions of, in the illustrated embodiment, 256×240, 128×120, 64×60, 32×30, and 16×15 picture elements for the luminance. The set of images, at the different image resolutions, is commonly referred to as a "resolution pyramid." The base of the pyramid is the full resolution image while the top of the pyramid is, in the illustrated embodiment, the 16×15 pixel image.

Similar resolution pyramids are formed for the "I" and "Q" chrominance components of a color image. However, for the discussion below, only the luminance component of the image shall be discussed. The same apparatus and processing steps are equally applicable to the chrominance components of the image.

In accordance with the lattice threshold quantization system, encoding of the image difference between the reference images and the original uncoded image is performed by an encoding circuitry 506 on a level by level basis, from the top level to the bottom level of the resolution pyramids. The process terminates at that resolution when no additional bits are available for video transmission. Thus, during a moderate motion, the system will typically reach the bottom or base level of 256×240 pixels while during a heavy motion the encoding may stop at the 128×120 level. Typically, during a scene change, the apparatus will run out of transmission bits earlier in the pyramid or divide the available lists among the several pyramid levels. Thus, in general, large changes of image or scenes are typically described first at the higher levels with the details being filled in later frames.

Figure 12:
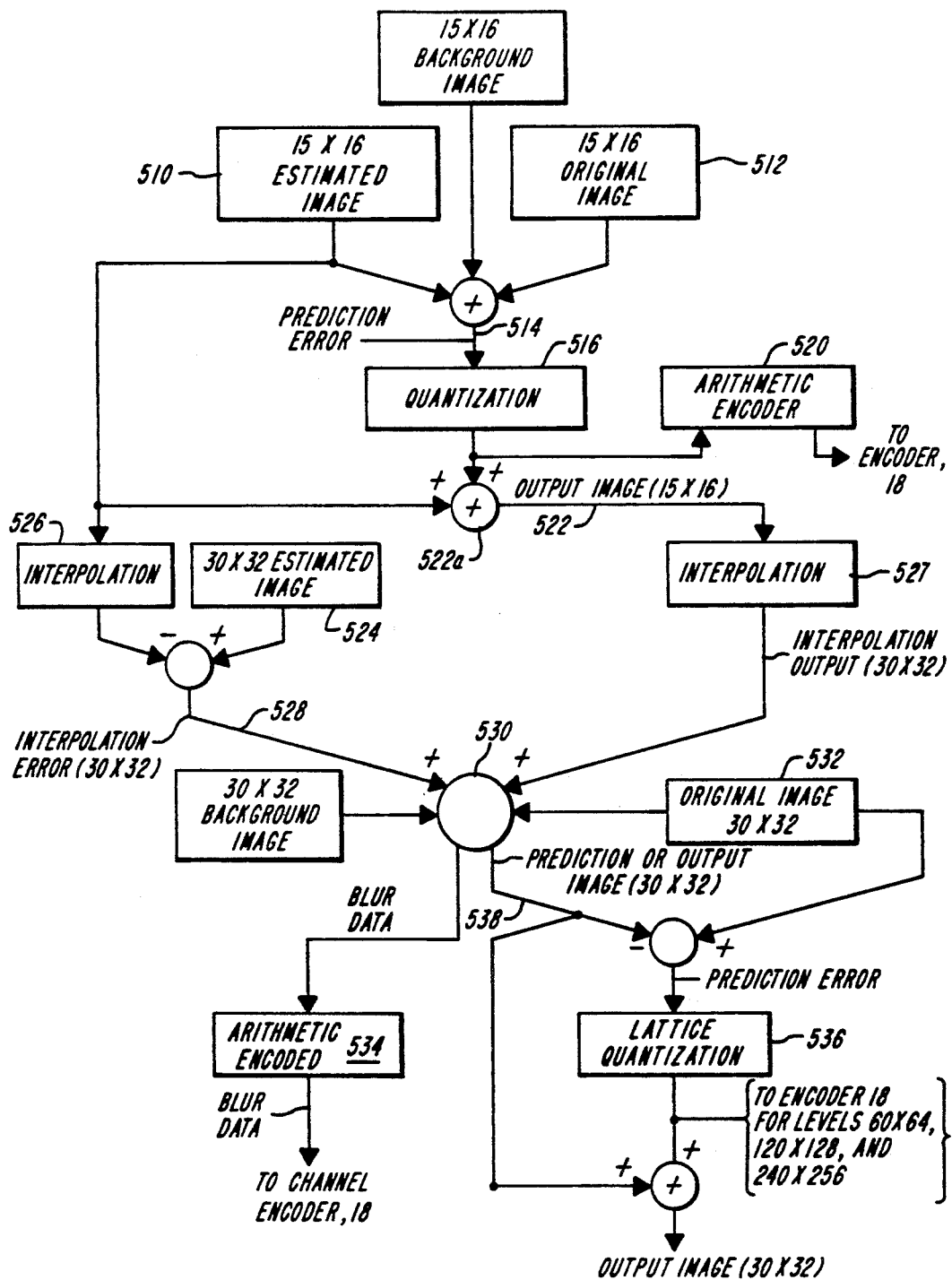
FIG. 12 is a detailed electrical block diagram of error calculator 43 according to the invention.

More particularly, in accordance with a preferred hierarchical coding system using entropy coded, lattice threshold quantization (EC-LTQ), encoding begins at the top level, that is, the 16×15 image. The selected components of the 16×15 version of the warped image or a background image are used as a prediction image. Recall that this corresponds to the image (decimated) that is created at the receiver absent any additional information. Referring to FIG. 12, this top level prediction is subtracted from the 16×15 decimated top level image of the original image. The difference image, representing the error at that top level, is quantized and the quantized information is directed to the encoder 18 for transmission to the receiver. Thereafter, the quantized difference image is added by adder 522a to the prediction image, at the 16×15 level, to form a 16×15 reconstructed image 52 which the receiver will also create.

At the lower levels, the prediction version of the image is formed in a different fashion. In accordance with the invention, the prediction is derived from the higher level reconstructed image and from the current level reference images as follows.

First, a warped interpolation error image is derived by interpolating the higher level warped image and subtracting it from the current level warped image. The resulting warped interpolation error image thus essentially extracts the spatially higher frequencies of the warped image, that is, information not present in the higher level image. The higher level reconstructed image is then interpolated to form an interpolated, reconstruction image at the current level. Finally, the warped interpolation error image is added to the interpolated reconstruction image to generate a first prediction image. Similarly, a background interpolation error is computed from the decimated background image and added to the interpolated reconstruction image to generate a second prediction. The warped interpolation error image or the background inerpolation error image is used where it improves the prediction but not otherwise. In other words, the interpolated reconstruction image is used as the current level prediction unless either of the first or second predictions are better. This is decided on a block-by-block basis, and the decisions are transmitted to the receiver as "side" information.

Thereafter, the steps for generating the difference signal at this lower level are the same as those at the top level, that is, the current level prediction image is subtracted from the current level original image and that difference is quantized and transmitted to the receiver. Thereafter the quantized difference is added to the prediction image at that level to form a reconstruction image for the current level. This procedure is repeated through the resolution pyramid until the bottom level is reached. The reconstructed image at the bottom level is the output image at the level, and it is that image that is displayed by the decoder. That image is also used as described above to form a warped image for the next frame. The warped image reconstruction at the transmitter is, as noted above, performed by the reconstruction circuitry 48.

If all of the available bits have been used before the bottom level is reached, the predictions at the lower levels are still generated in the same manner; however, no coding, that is, no quantized difference information is sent to the receiver. Instead, the prediction at the lowest levels will be used directly as the output or reconstruction image at that level and as the error reconstruction image over lines 54 from reconstructor circuitry 48.

Figure 5:
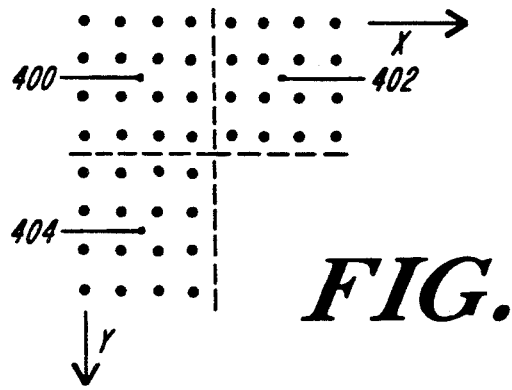
FIG. 5 is a diagrammatic representation of a spatial interpolation process.
Figure 6:
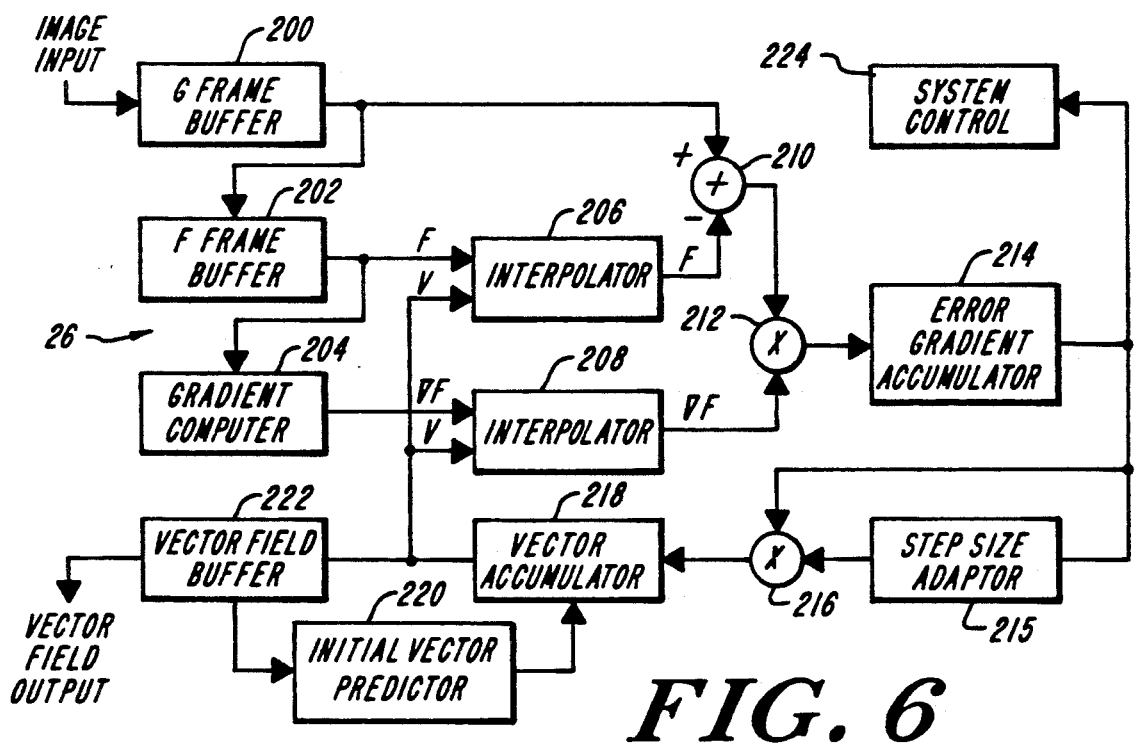
FIG. 6 is an electrical block diagram of an iterative spatial-domain motion estimation apparatus utilizing adaptive, steepest descent error minimization.
Figure 7:
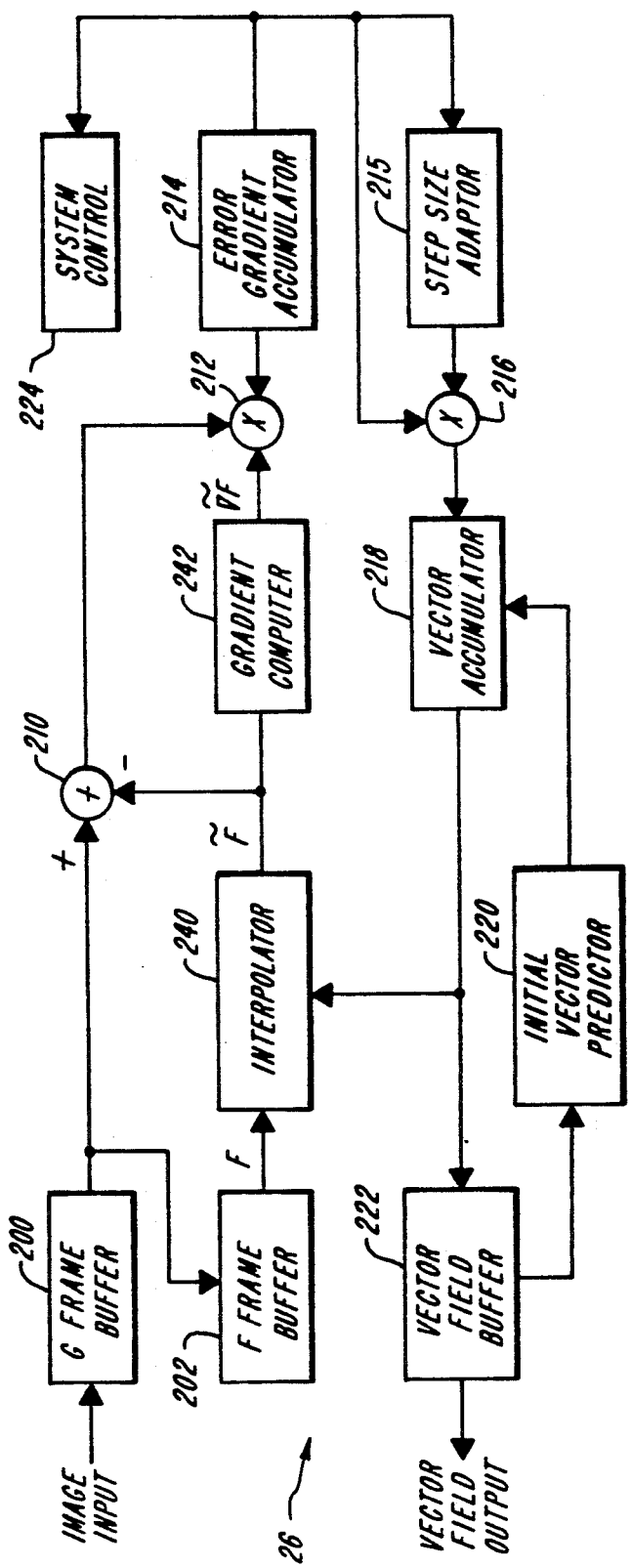
FIG. 7 is an electrical block diagram of an iterative spatial-domain motion estimation apparatus utilizing adaptive, steepest descent error minimization with an improved data processing structure.
Figure 9:
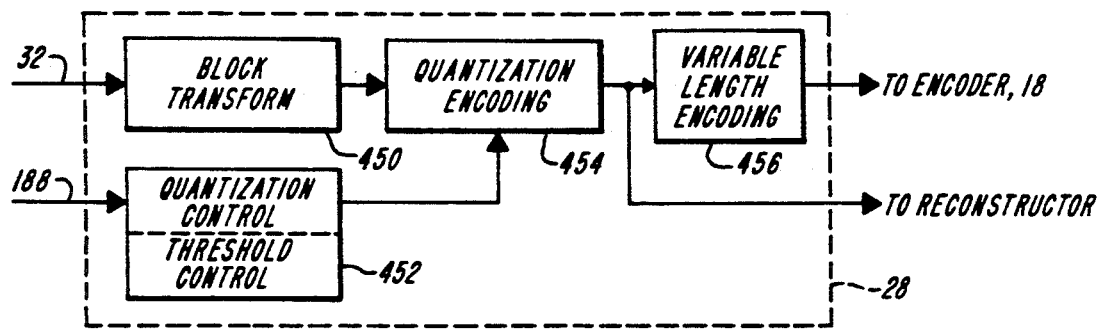
FIG. 9 is a block diagram of the lossy compressor 28 according to the invention.

Details of the Hierarchical Coded, Lattice Threshold Quantization Encoding System Referring to FIG. 5, the resolution pyramid is formed, as noted above, by decimating four times, in this illustrated embodiment, the highest resolution level of the image. In the one dimensional relationship illustrated in FIG. 5, each pair of pixels at a lower level are averaged to form a single pixel at an upper level. The situation is the same both horizontally and vertically so that each higher level picture element is located at the center of a 2×2 pixel group of the lower level. The coding method also provides for generating, using an interpolation procedure, the pixels at a lower level from a higher level. The interpolation process is applied, for example, to the warped and reconstructed images to obtain images for processing at the next lower level and is effected by a bilinear interpolation. The interpolation factors are 0.75 and 0.25.

In the illustrated embodiment of the invention, arithmetic coding is employed for both coding of information for transmission from the lossy compressor 28 as well as, and as will be discussed in more detail below, the coding of scalar data from error calculation module 43. Arithmetic coding is well known to those skilled in the art. In particular, it can be applied advantageously to describing the locations of non-zero transform or other array variables. The symbol probabilities are changed depending upon previously transmitted values and the sequence position of the coefficient. Prestored probabilities are employed since on-line adaptation does not, in the experience of the inventor, provide significant improvement in this application.

Considering the encoding of the resolution pyramids in more detail, and referring to FIG. 12, the original and warped images have, at the top level, a resolution of 15×16 pixels for the luminance and 8×8 pixels for the chrominance, respectively. FIG. 12 describes the processing of the luminance component; and the processing of the chrominance component (not shown) can be similarly illustrated. The prediction image consists of the top level warped image that was obtained originally by four decimations of the warped luminance and chrominance images, respectively. The prediction error is generated by subtracting the prediction image 510 from the original, uncoded, top level decimated image 512. The image differences over line 514 are quantized by a scalar quantizer 516 having a fixed step size. The quantized information over line 518 is encoded separately for each component, the Y, the I, and the Q components, using the same arithmetic encoder 520 which is also employed for the motion vector transform coefficients. Encoder 520 uses a Markov Model for encoding the non-zero data locations. The encoder has sixteen states depending upon whether the already encoded four nearest neighbors corresponding to the four nearest neighbors illustrated in FIG. 8 are zero or non-zero. The non-zero values are encoded by a memory less coder that encodes the eight bit quantization indices into the bit stream. The quantized difference image is added to the prediction as noted above, and the result is the output or reconstruction image (over lines 522) at the top level.

The scalar quantizer 516 used in connection with the top level prediction error is a uniform quantizer having a dead-zone around zero. It codes the sign with a 1 bit and the magnitude with 7 bits in the illustrated embodiment. The thresholds (T(i)) for the magnitude are located at:

$$T(i) = i * T$$

$$i = 1, 2, \ldots, N \qquad \text{(Equation 1)}$$

The reconstruction levels (R(i)) are defined by:

$$R(0) = 0 \qquad \text{(Equation 2)}$$

$$R(i) = (i + \text{Delta} * R) \quad i = 1, 2, \ldots, N$$

Therefore, a value of X, where X is greater than T(k) but less than T(k+1) is assigned a quantizer index value of k and is reconstructed at the receiver as having a value R(k). The quantizer is also symmetric around zero and sets all values with a magnitude less than T(1) equal to zero.

For the lower levels of the resolution pyramid, the prediction image is generated by combining the interpolated output image from the next higher level with the selected interpolation error of the same level. Then, the prediction error is formed by taking the difference of the original image at the current level. The difference image is coded using a lattice threshold quantizer and the quantized difference is added to the prediction to obtain a new output image at the current level. The Y, I, and Q components are treated as three separate images.

Considering the lower levels in more detail, the first prediction image is generated by combining the warped image at the current level with the output and warped images from the next higher level. Specifically, the interpolation error of the warped image is generated using the warped image 524 at the current level and an interpolated version of the warped image from the next higher level (interpolated by circuitry 526). That interpolation error is thus the difference between the current level warped image and the same image that has been decimated and interpolated. As noted above, it contains the details of the warped image that were lost in the decimation to form the next higher level image. The output image from the next higher level is then interpolated at interpolation circuitry 527 to obtain an image at the current level. Thereafter, the warped interpolation error over line 528 is added by adder 530 to the interpolated output image to form the first prediction. The second prediction is formed in the same manner from the decimated background image. Thus, for each block of 8×8 pixels, the squared error is determined between the original image stored at 532 and three possible predictions, that is, between the interpolated output image from the next higher level with and without the inclusion of the warped interpolation error, and also that with the inclusion of the background interpolation error.

The elimination of the warped interpolation error is equivalent to low pass filtering the warped image for the prediction. This effective filtering process is performed in all blocks where it provides a significant decrease in the prediction error, that is, in those blocks wherein motion compensation was not successful. The result of the filtering process, termed "blurring," is effected if the "blurred error," multiplied by a weighting factor, such as 1.5 in the illustrated embodiment, is less than the error using the warped interpolation error. The use of the background image is equivalent to a long term memory such that a representative of the non-moving object can be retained by the decoder even when these objects are briefly occluded. This background frame should only be used when a significant gain is achieved over other choices. Therefore, its weighting factor is 20%-25% greater than the "blurring" weight.

The blur information generate a one or two bit (3 states) word for each 8×8 block. This is similar to the method used in motion vector field coding, and these two bits "answer" the following two questions:

a) Does the system blur the current (8×8) block?
b) If blurring is not preformed, should warped prediction or the background image be used?

For example, a one indicates blurring and a zero indicates no blurring. The information is encoded using an arithmetic coder 534 such as that noted earlier, and since each word contains only one bit, there is no need to encode the non-zero values once the "blur location map" has been encoded.

The particular arithmetic encoder 534 for the blur information uses six binary variables to select one of thirty-two states with corresponding probabilities. The binary variables are the four previously encoded blur words for neighboring blocks at the same level and the blur word for the higher level neighbor, that is, the block at the next higher level that corresponds to the current block. Thus, the encoder does not make explicit use of the fact that blurring at one level propagates to lower levels and instead this relationship is reflected in the probabilities for the various states having a non-zero higher level neighbor.

The prediction errors themselves are coded by the lattice quantizer 536. Thus, at each level, the Y, I, and Q components are treated as three separate images. Each different image, generated for each level, is thus divided into blocks of 4×2 pixels. Each block then becomes the "vector" and is coded by the lattice quantization by first determining a closest point and thereafter indexing the point as described in greater detail below.

The remaining levels can be encoded using the procedures applied at the (30×32) level, and using equivalents of elements 524, 526, 527, an adder 538, and elements 530, 534, and 536, but with the exception that the image data will be encoded, in the preferred embodiment, as described below.

The entropy coded, lattice threshold quantization described herein replaces the vector quantization described in Ericsson, U.S. Pat. No. 4,849,810. In comparing vector quantization (VQ) encoding with entropy coded, lattice threshold quantization encoding, we know, from Shannon Theory, that as the size and dimension of an optimally designed VQ codebook increases, its performance approaches the operational distortion-rate bound, without the need for entropy coding. Complexity in the VQ process, however, also grows without bound, and clever methods must be used to obtain good performance with only moderate complexity. Lattice quantizers that are optimum in the Shannon sense were, prior to the invention herein, known for only a handful of sources and dimensions. For example, the hexagonal lattice is optimum for an independent, identically distributed uniform source in two dimensions. It has also been shown that a rectangular lattice works well for independent, identically distributed Laplacian sources. In general, one can show that lattices having high sphere packing densities work well for independent, identically distributed sources, provided the coding rate is high and an efficient entropy code is used for transmitting the indicies. Achieving good performance at low rates and for sources with memory, such as that described in this application, has been an exclusive goal.

Advantages of Background Prediction Using Spatially Decimated Images

The use of background prediction of spatially decimated images provides several advantages over conventional background prediction systems. First, generating a prediction error based only on the full resolution background image can produce visible switching artifacts in the reconstructed image. Independently selecting between the background and warped images at each resolution level reduces these switching artifacts and decreases the resultant prediction error. This reduction in prediction error is particularly significant in the following circumstances:

1) at a motion boundary at a depth discontinuity in a scene,
2) in the case of a transparent foreground moving in front of the background, and
3) moving shadows on a background.

Figure 4:
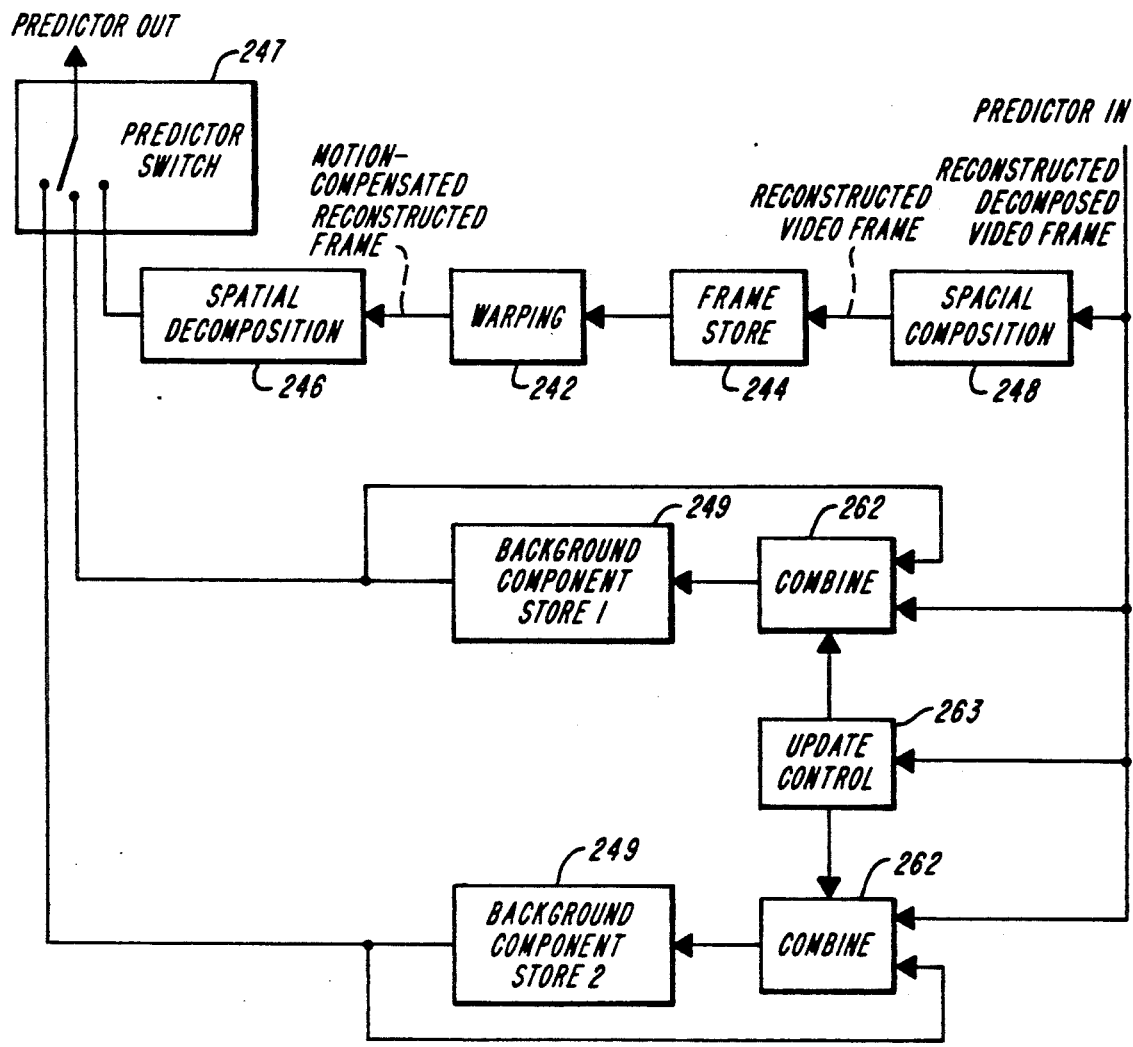
FIG. 4 is an electrical block diagram of background prediction circuitry having a pair of background frame buffers.

Further, spatial decomposition allows a background image to be built more efficiently as, for example, after a quick change in the scene. The preferred embodiment first loads the background frame buffer with the low resolution components. The higher resolution components are then progressively added with time using the update controller 63 and combining circuitry 62. In an alternative embodiment, error circuitry 14 includes a pair of background frame buffers 249, each for storing a background image of a different scene. As shown in FIG. 4, a common update controller 263 determines which frame buffer contains the background of the present scene. Although any method may be used to identify the relevant background buffer, one method is to compare the previous frame image stored in frame buffer 244 with each of the background buffers. The background image most similar to the previous frame image is the current background. An alternative method is to monitor the reference point signal. The background frame buffer most often selected as the reference point is the relevant buffer.

Additions, subtractions, deletions, and other modifications of the preferred particular embodiments of the invention will be apparent to those practiced in the art and are within the scope of the following claims.

What is claimed is:

1. A method for encoding interframe error data, in an image transmission system, for transmitting a sequence of image frames, said method comprising:
    compiling a spatially decomposed image of a background of the sequence of image frames,
    spatially decomposing a warped image of a previous frame,
    spatially decomposing a new input image,
    comparing said spatially decomposed input image with said spatially decomposed background image and said spatially decomposed warped image, and
    generating an error signal defining said spatially decomposed input image based on said spatially decomposed warped image and said spatially decomposed background image.

2. The method of claim 1 further comprising the steps of
comparing said current image data to previous image data representing a previous image frame,
based on said comparison, generating a motion signal representing the displacement of each of a plurality of blocks of said previous image,
transmitting said motion signal to said remote receiver to allow said receiver to prepare said warped image pyramid data structure.

3. A method for transmitting a sequence of image frames comprising the steps of:
maintaining a background pyramid data structure having a plurality of decimation levels, each decimation level comprising at least one spatial component, said background pyramid data structure representing a background of said sequence of image frames,
preparing a warped image pyramid data structure having a plurality of decimation levels, each decimation level comprising at least one spatial component, said warped image pyramid data structure representing an estimate of a current image frame based on at least one previous image frame,
decimating current input image data representing said current image frame to generate a current image pyramid data structure having a plurality of decimation levels, each decimation level comprising at least one spatial component,
for at least one decimation level,
based on said warped image pyramid data structure, preparing a first prediction image component for each of a plurality of spatial components at said decimation level,
comparing said first prediction image component with a corresponding spatial component of said current image pyramid data structure to form a first error signal,
based on said background pyramid data structure, preparing a second prediction image component for each of a plurality a spatial components at said decimation level,
comparing said second prediction image component with a corresponding spatial component of said current image pyramid data structure to form a second error signal, and
selecting one of said first prediction image component and said second prediction image component, and
transmitting electrical signals representing said selection to a receiver.

4. The method of claim 3 wherein selecting one of said first and second prediction components comprises the steps of:
for each of said first and second error signals estimating the number of bits required to encode the error signal, and
selecting from said first and second error signals, the error signal requiring the smallest estimated number of bits.

5. The method of claim 4 wherein:
estimating the number of bits comprises the steps of:
for each error signal, calculating an error energy E equal to the mean squared error signal,
determining the number of bits N required to notify the receiver if the associated error signal is selected, and
computing a weighted combination of E and N as representative of the number of bits required to encode said associated error signal, and wherein:
selecting from said first and second error signals comprises selecting the error signal which yields the lowest weighted combination.

6. The method of claim 5 wherein transmitting electrical signals representing said selection comprises:
transmitting a code indicating which of said first or second error signals was selected,
encoding said selected error signal, and
transmitting said encoded error signal.

7. The method of claim 3 further comprising the steps of:
for each decimation level,
based on a default image pyramid data structure, preparing a third prediction image component for each of a plurality of spatial components at said decimation level,
comparing said third prediction image component with a corresponding spatial component of said current image pyramid data structure to form a third error signal, and
selecting one of said first, second and third prediction image components.

8. The method of claim 7 wherein selecting one of said first, second and third prediction components comprises the steps of:
for each of said first, second and third error signals, estimating the number of bits required to encode the error signal, and
selecting from said first, second and third error signals, the error signal requiring the smallest estimated number of bits.

9. The method of claim 8 wherein:
estimating the number of bits comprises the steps of:
for each error signal, calculating an error energy E equal to the mean squared error signal,
determining the number of bits N required to notify the receiver if the associated error signal is selected, and
computing a weighted combination of E and N as representative of the number of bits required to encode said associated error signal, and wherein:
selecting from said first, second and third error signals comprises selecting the error signal which yields the lowest weighted combination.

10. The method of claim 3 wherein said step of maintaining a background pyramid structure comprises the steps of:
preparing a reconstructed image pyramid data structure representative of a receiver image data structure prepared by said receiver in response to said transmitted electrical signals,
for each component of said reconstructed image pyramid data structure, determining the number of frames since said component was last changed,
generating a weighting factor which is proportional to said determined number of frames, and
for each component of said background pyramid data structure, computing a new component value equal to a weighted sum of the background component value and the value of a corresponding component of said reconstructed image pyramid data structure, the relative weight accorded said background component value being determined by said weighting factor.

11. The method of claim 10 further comprising the step of:

dynamically adjusting the weighting factor during actual use of the method with a connected communication channel.

12. An image encoding device for encoding interframe error data, in an image transmission system, for transmitting a sequence of image frames, comprising:

means for compiling a spatially decomposed image of a background of the sequence of image frames, means for spatially decomposing a warped image of a previous frame, means for spatially decomposing a new input image, means for comparing said spatially decomposed input image with said spatially decomposed background image and said spatially decomposed warped image, and means for generating an error signal defining said spatially decomposed input image based on said spatially decomposed warped image and said spatially decomposed background image.

13. An image encoding device for transmitting a sequence of image frames comprising:

means for maintaining a background pyramid data structure having a plurality of decimation levels, each decimation level comprising at least one spatial component, said background pyramid data structure representing a background of said sequence of image frames, means for preparing a warped image pyramid data structure having a plurality of decimation levels, each decimation level comprising at least one spatial component, said warped image pyramid data structure representing an estimate of a current image frame based on at least one previous image frame, means for decimating current input image data representing said current image frame to generate a current image pyramid data structure having a plurality of decimation levels, each decimation level comprising at least one spatial component, for at least one decimation level, means for preparing a first prediction image component for each of a plurality of spatial components at said decimation level based on said warped image pyramid data structure, means for comparing said first prediction image component with a corresponding spatial component of said current image pyramid data structure to form a second error signal, means for selecting one of said first prediction image component with a corresponding spatial component of said current image pyramid data structure to form a second error signal, means for selecting one of said first prediction image component and said second prediction image component, and means for transmitting electrical signals representing said selection to a receiver.

14. The image encoding device of claim 13 further comprising means for comparing said current image data to previous image data representing a previous image frame, based on said comparison, generating a motion signal representing the displacement of each of a plurality of blocks of said previous image, and means for transmitting said motion signal to said remote receiver to allow said receiver to prepare said warped image pyramid data structure.

15. The image encoding device of claim 13 wherein said means for selecting one of said first and second prediction components comprises:

means for estimating the number of bits required to encode each of said first and second error signals, and means for selecting from said first and second error signals, the error signal requiring the smallest estimated number of bits.

16. The image encoding device of claim 15 wherein said means for estimating the number of bits comprises:

means for calculating, for each error signal, an error energy E equal to the mean squared error signal, means for determining the number of bits N required to notify the receiver if the associated error signal is selected, and means for computing a weighted combination of E and N as representative of the number of bits required to encode said associated error signal, and wherein:

said means for selecting from said first and second error signals comprises means for selecting the error signal which yields the lowest weighted combination.

17. The image encoding device of claim 15 wherein said means for transmitting electrical signals representing said selection comprises:

means for transmitting a code indicating which of said first or second error signals was selected, means for encoding said selected error signal, and means for transmitting said encoded error signal.

18. The image encoding device of claim 13 further comprising:

for each decimation level, means for preparing a third prediction image component for each of a plurality of spatial components at said decimation level based on a default image pyramid data structure, means for comparing said third prediction image component with a corresponding spatial component of said current image pyramid data structure to form a third error signal, means for selecting one of said first, second and third prediction image components.

19. The image encoding device of claim 18 wherein said means for selecting one of said first, second and third prediction components comprises:

means for estimating, for each of said first, second and third error signals, the number of bits required to encode the error signal, and means for selecting from said first, second and third error signals, the error signal requiring the smallest estimated number of bits.

20. The image encoding device of claim 19 wherein said means for estimating the number of bits comprises:

means for calculating, for each error signal, an error energy E equal to the mean squared error signal, means for determining the number of bits N required to notify the receiver if the associated error signal is selected, and means for computing a weighted combination of E and N as representative of the number of bits required to encode said associated error signal, and wherein said means for selecting from said first, second and third error signals comprises means for selecting the error signal which yields the lowest weighted combination.

21. The image encoding device of claim 13 wherein said means for maintaining a background pyramid structure comprises:
means for preparing a reconstructed image pyramid data structure representative of a receiver image data structure prepared by said receiver in response to said transmitted electrical signals,
means for determining, for each component of said reconstructed image pyramid data structure, the number of frames since said component was last changed,
means for generating a weighting factor which is proportional to said determined number of frames, and
means for computing, for each component of said background pyramid data structure, a new component value equal to a weighted sum of the background component value and the value of a corresponding component of said reconstructed image pyramid data structure, the relative weight accorded said background component value being determined by said weighting factor.

22. The image encoding device of claim 21 further comprising:
means for dynamically adjusting the weighting factor during actual use of the method with a connected communication channel.

* * * * *